(12) United States Patent
Thraenhardt et al.

(10) Patent No.: US 10,693,570 B2
(45) Date of Patent: Jun. 23, 2020

(54) DEVICE AND METHOD OF ANALYZING A RADIO FREQUENCY SIGNAL

(71) Applicant: Rohde & Schwarz GmbH & Co. KG, Munich (DE)

(72) Inventors: Marcel Thraenhardt, Freising (DE); Michael Kaltenbach, Olching (DE); Georg Schnattinger, Dorfen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/999,410

(22) Filed: Aug. 20, 2018

(65) Prior Publication Data

US 2020/0059307 A1 Feb. 20, 2020

(51) Int. Cl.
*H04B 17/23* (2015.01)

(52) U.S. Cl.
CPC ................... *H04B 17/23* (2015.01)

(58) Field of Classification Search
CPC .... H04B 17/101; H04B 17/21; H04B 1/1027; H04B 17/23; H04B 1/06; H04L 27/00; H04L 1/206; H04L 1/24; H04L 1/244
See application file for complete search history.

(56) References Cited

U.S. PATENT DOCUMENTS

| | | | | |
|---|---|---|---|---|
| 6,882,946 B2* | 4/2005 | Bell | ........................ | G01R 23/16 455/423 |
| 8,022,687 B2* | 9/2011 | Ortler | .................. | G01R 35/005 324/638 |

FOREIGN PATENT DOCUMENTS

EP  0019630 B1  5/1983

* cited by examiner

*Primary Examiner* — Rahel Guarino
(74) *Attorney, Agent, or Firm* — Christensen O'Connor Johnson Kindness PLLC

(57) ABSTRACT

A device for analyzing a radio frequency signal is described. The device comprises an analyzing module that is configured to analyze input data relating to a multicarrier radio frequency signal with at least two carrier frequencies. The multicarrier analyzing module is further configured to calculate at least one of an optimized intermediate frequency and an optimized local oscillator frequency based on the input data. In addition, a method of analyzing a radio frequency signal is described.

18 Claims, 1 Drawing Sheet

DEVICE AND METHOD OF ANALYZING A RADIO FREQUENCY SIGNAL

FIELD OF THE DISCLOSURE

Embodiments of the present disclosure relate generally to a device for analyzing a radio frequency signal. Further, embodiments of the present disclosure relate generally to a method of analyzing a radio frequency signal.

BACKGROUND

In modern telecommunication devices, radio frequency signals are used that have multiple carriers with respective carrier frequencies so that it is possible to achieve high data rates. The respective multicarrier radio frequency signal may be obtained by a multicarrier modulation. Furthermore, the multicarrier radio frequency signals may be used for communication with several users.

In the state of the art, those radio frequency signals with multiple carrier frequencies are analyzed by using several spectrum analyzers each being assigned to a certain frequency range or rather carrier frequency. Alternatively, a single spectrum analyzer may be used for measuring several frequency ranges of the radio frequency signal wherein these several frequency ranges are assigned to the multiple carriers of the radio frequency signal. Accordingly, a frequency preselection is obtained by the respective hardware components of the spectrum analyzer(s) used, for instance internal filters set appropriately.

Moreover it is known to use so-called homodyne receivers, also called direct conversion receivers, with a filter that is positioned in front of the homodyne receiver. The filter provides a frequency preselection so that a certain frequency range is measured by the homodyne receiver assigned to the carrier frequency.

However, the test equipment as well as the testing are expensive when using the test equipment mentioned above. In addition, the testing lasts long when the several frequency areas are measured in a subsequent manner.

Accordingly, there is a need for a simple and cost-efficient possibility to analyze a radio frequency signal having multiple carriers.

SUMMARY

Embodiments of the present disclosure provide a device for analyzing a radio frequency signal, comprising a multicarrier analyzing module that is configured to analyze input data relating to a multicarrier radio frequency signal with at least two carrier frequencies, the multicarrier analyzing module being further configured to calculate at least one of an optimized intermediate frequency and an optimized local oscillator frequency based on the input data.

Further, embodiments of the present disclosure provide a method of analyzing a radio frequency signal, with the following steps:

receiving input data that relates to a multicarrier radio frequency signal with at least two carrier frequencies;

processing the input data; and calculating at least one of an optimized intermediate frequency and an optimized local oscillator frequency based on the input data.

Accordingly, the present disclosure enables to determine the ideal value for the intermediate frequency or rather the local oscillator frequency, for example with regard to the testing conditions that are inter alia defined by the radio frequency signal itself. In some embodiments, the respective value of the frequency corresponds to a degree of freedom (variance) so that the respective value can be chosen while processing or rather analyzing the input data. This means that the intermediate frequency and/or the local oscillator frequency may be selected from a range of values wherein the respective frequency is used by a measurement device for measuring the radio frequency signal.

The device as well as the method of analyzing the radio frequency signal ensure that the best value is chosen by executing an optimization process that takes the input data, for example the information with regard to the radio frequency signal to be measured, into account when determining the respective optimized frequency, namely the optimized intermediate frequency and/or the optimized local oscillator frequency. For instance, the optimization process shall achieve a maximized accuracy of the measurement to be performed when the radio frequency signal is measured by the measurement device.

Therefore, the present disclosure distinguishes from known methods that scan or perform a measurement of the radio frequency signal so as to determine a frequency of the radio frequency signal. This frequency obtained from the signal may be used as input data. However, the present disclosure relates to determining an ideal value for the intermediate frequency and/or the local oscillator frequency used by a measurement device so that an appropriate measurement of the radio frequency signal is ensured.

For doing so, the multicarrier analyzing module receives data concerning the occupied frequency configuration of the multicarrier signal, namely the radio frequency signal. The occupied frequency configuration is taken into consideration while calculating the ideal value for the intermediate frequency and/or the local oscillator frequency to be used by the measurement device.

In some embodiments, the carrier frequencies of the multicarrier radio frequency signal or rather data relating thereto is used by the multicarrier analyzing module for analyzing purposes so that optimized operation parameters for the measurement device can be determined, namely the optimized intermediate frequency and/or the optimized local oscillator frequency.

In general, the multicarrier analyzing module is enabled to calculate the optimized intermediate frequency and/or the optimized local oscillator frequency wherein the multicarrier analyzing module takes the input data, for example the at least two carrier frequencies, into account for calculating the optimized intermediate frequency and/or the optimized local oscillator frequency.

Thus, the multicarrier analyzing module of the device for analyzing the radio frequency signal is configured to perform the respective steps of the method of analyzing the radio frequency signal. In other words, the multicarrier analyzing module is configured to perform the method of analyzing the radio frequency signal. In some embodiments, the multicarrier analyzing module can be implemented in software or hardware or a combination of software and hardware.

Generally, the intermediate frequency is a frequency that occurs when the radio frequency has been processed by a measurement device. In some embodiments, a local oscillator signal with a local oscillator frequency is mixed with the radio frequency signal so that the frequency of the radio frequency signal is shifted. The result of the mixing is a signal with the intermediate frequency. This signal with the intermediate frequency is used for internal processing of the measurement device, for instance. Usually, the radio frequency signal is shifted for amplifying purposes.

Hence, the intermediate frequency as well as the local oscillator frequency are correlated with each other.

In contrast to the prior art, the apparatus as well as the method ensure that a preselection can be done based on the analyzing result instead of filtering or the usage of other hardware components for preselection. Accordingly, bandpass filters can be avoided since an intelligent choice of the operational parameters of the measurement device is done by using the multicarrier analyzing module. Therefore, the overall costs are reduced.

In some embodiments, the respective optimized frequency is calculated so as to ensure that spurious signal portions can be suppressed effectively while measuring the radio frequency signal, for example a certain carrier of the radio frequency signal.

An aspect of the disclosure provides that the multicarrier analyzing module is configured to analyze the input data automatically. Therefore, no additional user input is required once the input data is provided that is processed internally by the device for analyzing the radio frequency signal. Once the analyzing process has started, the following processes or rather steps are done automatically, for example the analyzing step.

In addition, the multicarrier analyzing module may be configured to calculate at least one of the optimized intermediate frequency and the optimized local oscillator frequency. In other words, the optimized intermediate frequency and/or the optimized local oscillator frequency are/is calculated automatically. The respective input data is processed or rather analyzed by the multicarrier analyzing module internally so that the optimized intermediate frequency and/or the optimized local oscillator frequency is output as the analyzing result.

According to an embodiment, the device has an input via which the input data is input, the input being connected with the multicarrier analyzing module. Therefore, the input data received is directly forwarded to the multicarrier analyzing module so that the input data can be processed appropriately.

For instance, the input data corresponds to at least one of the multicarrier radio frequency signal and data that is input by a user of the device. In other words, the input data may be a multicarrier radio frequency signal and/or data that is input by the user manually. The data input by the user may relate to a data set or any other data entered.

Thus, the device for analyzing a radio frequency signal may directly receive the radio frequency signal wherein the device is configured to analyze the radio frequency signal (automatically) so as to obtain the information required by the multicarrier analyzing module for calculating the respective optimized frequency. In some embodiments, the carrier frequencies can be retrieved easily by doing a frequency sweep and applying known analyzing procedures.

Alternatively or additionally, the user may input the respective data that relate to parameters of the radio frequency signal, for example the at least two carrier frequencies of the multicarrier radio frequency signal. The respective data input ensures that the multicarrier analyzing module is enabled to calculate the respective optimized frequency.

Hence, the input data may be input by a user or the input data corresponds to a multicarrier radio frequency signal received.

Another aspect provides that the multicarrier analyzing module is configured to measure parameters assigned to the at least two carrier frequencies. In other words, the parameters assigned to the at least two carrier frequencies are measured so as to provide the information required by the multicarrier analyzing module. The respective parameters may characterize the at least two carrier frequencies of the multicarrier radio frequency signal or rather the carriers assigned to the at least two carrier frequencies. For instance, the parameters measured relate to the center frequency and/or a bandwidth of the respective carrier.

Moreover, parameters assigned to the at least two carrier frequencies may be input by a user. Put it another way, the parameters assigned to the at least two carrier frequencies are input by the user so as to provide the information required by the multicarrier analyzing module. Therefore, the user may input the respective parameters that characterize the at least two carriers or rather the carrier frequencies of the radio frequency signal. Hence, it is not required that the radio frequency signal itself is input to the device for analyzing the radio frequency signal. In some embodiments, the respective data is sufficient that characterizes the radio frequency signal in an appropriate manner, for example the multiple carriers or rather their frequencies.

Another aspect of the disclosure provides a display, which is connected to the multicarrier analyzing module of the device, the display receiving output data of the multicarrier analyzing module, the output data comprising at least one of the optimized intermediate frequency and the optimized local oscillator frequency. Hence, at least one of the optimized intermediate frequency and the optimized local oscillator frequency (calculated previously) is at least one of output and displayed on the display. Therefore, the respective data or rather frequency values are displayed on the display so that the user gets informed directly. The user may use the information displayed for setting a separately formed measurement device appropriately that is used for measuring the radio frequency signal. For instance, the separately formed measurement device may be a frequency selective power sensor such as a so-called NRQ. The respective optimized frequency may correspond to an operation parameter of the measurement device which operation parameter can be adapted due to the analysis so as to ensure appropriate measurement of the radio frequency signal. Thus, the optimized operation parameter(s) can be achieved in a cost-efficient and fast manner while using the device for analyzing a radio frequency signal.

For instance, the display is part of a user interface of the device. The user interface may also comprise the input by which the user is enabled to input the respective input data. For instance, the display is a touch-sensitive display so that the user can interact with the device in an intuitive manner.

Moreover, the device itself may be a measurement device that is configured to measure the radio frequency signal. Thus, the device itself is also enabled to perform the respective measurement. The measurement may be done in an optimized manner since the radio frequency signal has been analyzed previously, for example the input data assigned to the radio frequency signal, so that the optimized operation parameters for the measurement are determined previously, for example in an automatic manner. Once the respective optimized operation parameters have been obtained, the device may be used to perform the measurement of the radio frequency signal.

As discussed above, the radio frequency signal may be analyzed in an abstract manner, while taking input data into account that define the radio frequency signal, namely the carrier frequencies or rather the carriers. In other words, the real radio frequency signal is not required for analyzing purposes.

In some embodiments, the measurement device is configured to use at least one of the optimized intermediate frequency and the optimized local oscillator frequency as an operation parameter for measuring the radio frequency signal. In other words, at least one of the optimized intermediate frequency and the optimized local oscillator frequency is used as an operation parameter for measuring the radio frequency signal with at least two carrier frequencies. Therefore, the device may analyze the radio frequency signal in a first step so that the respective optimized intermediate frequency and/or the optimized local oscillator frequency are/is obtained. The respective frequency or rather frequencies can be used as operation parameter(s) of the (measurement) device so that it is ensured that the measuring of the radio frequency signal is done in an optimized manner.

The device may be configured such that the measurement takes place automatically once the optimized local oscillator frequency and/or the optimized intermediate frequency has been obtained.

Therefore, the multicarrier analyzing module may be configured to control a local oscillator appropriately, for example an internal local oscillator, so that the optimized intermediate frequency is achieved. This can be done by adapting the local oscillator frequency appropriately which in turn influences the intermediate frequency obtained after the mixing. Alternatively, the optimized intermediate frequency is output by the device wherein the respective local oscillator frequency is calculated based on the optimized intermediate frequency so that the local oscillator is controlled appropriately. In any case, it is ensured that the mixed signal has the optimized intermediate frequency.

Alternatively, the respective optimized frequency is input into a separately formed measurement device so that its operation parameters are adapted appropriately. The separately formed measurement device and the device for analyzing a radio frequency signal together form a measurement setup.

In addition, parameters of a measurement device may be taken into account while calculating at least one of the optimized intermediate frequency and the optimized local oscillator frequency based on the input data, the measurement device measuring the radio frequency signal. In other words, the multicarrier analyzing module is also configured to retrieve information (as part of the input data) relating to the measurement device used for measuring the radio frequency signal. These parameters may relate to a model of the measurement device.

Generally, the input data may comprise data related to the measurement device or rather the measurement setup as well as the multicarrier radio frequency signal, for example the carrier frequencies.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
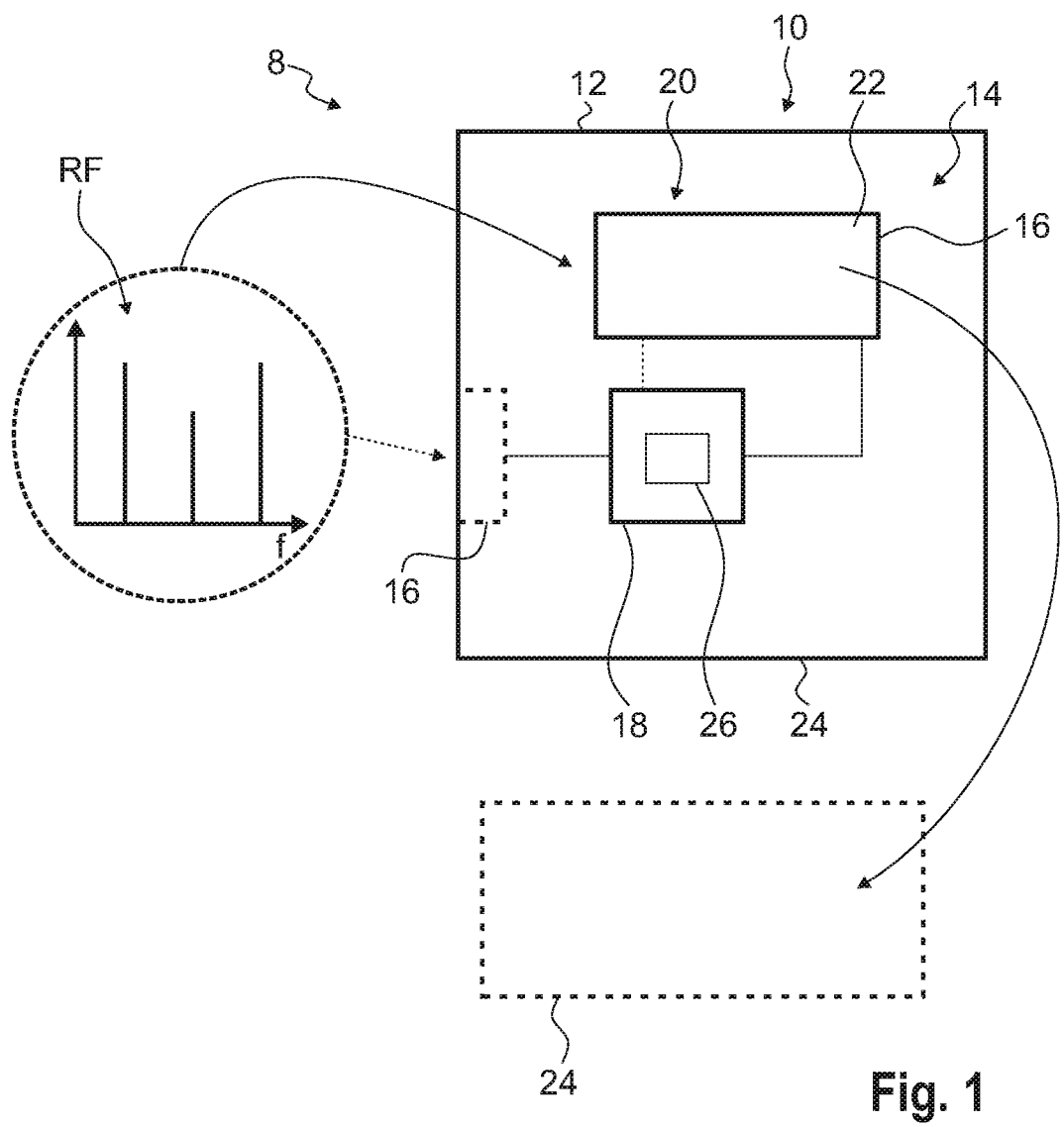
FIG. 1 shows a schematic overview of a measurement setup with a device for analyzing a radio frequency signal according to an embodiment of the present disclosure.

In FIG. 1, a measurement setup 8 is shown that comprises a device 10 for analyzing a radio frequency signal RF of which a schematic representation is also illustrated. As shown in FIG. 1, the radio frequency signal RF comprises several carrier frequencies.

The device 10 has a housing 12 that encompasses several internal electronic components 14 that are used for processing input data which is input via an input 16 of the device 10 as will be explained later. The device 10 further comprises a multicarrier analyzing module 18 that is connected with the input 16 so that the input data received via the input 16 is forwarded to the multicarrier analyzing module 18 for analyzing purposes.

Figure 2:
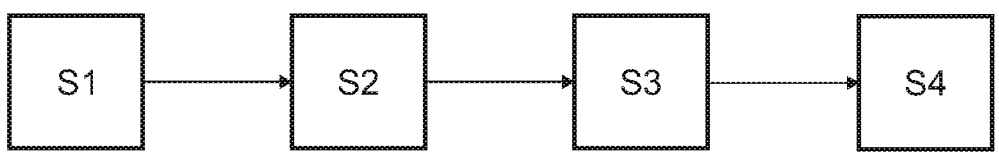
FIG. 2 shows a flow-chart illustrating a method of analyzing a radio frequency signal according to an embodiment of the present disclosure.

The multicarrier analyzing module 18 is generally configured to analyze the respective input data that is assigned to the multicarrier radio frequency signal RF having at least two carrier frequencies as will be described later while also taking FIG. 2 into account.

In the shown embodiment, the input 16 corresponds to a user interface 20 that also comprises a display 22. Thus, the user interface 20 may be established by a touch-sensitive display 22 so that the user can intuitively control the device 10 by touching the display 22. Accordingly, the user may input the input data via the user interface 20 manually. Therefore, the user interface 20 is connected with the multicarrier analyzing module 18 so that the input data is forwarded to the multicarrier analyzing module 18 for analyzing purposes.

The user interface 20 or rather the display 22 is also connected with the multicarrier analyzing module 18 so that output data of the multicarrier analyzing module 18 is output to the user of the device 10 via the user interface 20 or rather the display 22. The information assigned to the output data is displayed on the display 22. Hence, the user gets informed about the analyzing result.

Hereinafter, the method of analyzing a radio frequency signal by using the measurement setup 8 will be described while also taking FIG. 2 into account. In a first step (step S1), input data is input into the device 10 wherein the input data is assigned to the multicarrier radio frequency signal RF with at least two carrier frequencies. The input data may be input by a user manually via the user interface 20 so that a data set may be input that provides information with regard to the radio frequency signal RF, for instance the at least two carrier frequencies. Accordingly, the user may enter certain parameters relating to the multicarrier radio frequency signal RF, for example the respective carrier frequencies or rather the carriers of the multicarrier radio frequency signal RF.

Alternatively or additionally, the input data may be input via an input 16 established by a radio frequency input that receives the radio frequency signal RF to be analyzed directly. The respective input 16 is shown by dashed lines in FIG. 1.

The device 10 may be configured to automatically measure the respective carrier frequencies provided by the multicarrier radio frequency signal RF that has been input previously via the input 16 for the radio frequency signal RF.

In general, the device 10, for example the multicarrier analyzing module 18, is configured to measure parameters assigned to the radio frequency signal RF, for example its carrier frequencies, directly and automatically from the radio frequency signal RF input via the input 16 for the radio frequency signal RF.

Once the input data has been received by the device 10, irrespective of the input 16 chosen, the input data is forwarded to the multicarrier analyzing module 18 that analyzes the input data (step S2).

For analyzing purposes, the multicarrier analyzing module 18 takes the input data assigned to the at least two carrier frequencies into account so as to calculate an optimized intermediate frequency and/or an optimized local oscillator frequency to be used for measuring the radio frequency signal RF (step S3).

In some embodiments, the multicarrier analyzing module 18 calculates based on the input data an optimized value for the measurement of the radio frequency signal RF which can be done by a separately formed measurement device 24 or rather by the device 10 itself that also comprises a measuring module 26. Hence, the device 10 itself corresponds to a measurement device 24.

In other words, the optimized intermediate frequency and/or the optimized local oscillator frequency calculated by the multicarrier analyzing module 18 correspond(s) to operation parameter(s) which are used by the measurement device 24 or rather the device 10 itself for measuring the multicarrier radio frequency signal RF with the appropriate operation parameters (step S4).

The respective operation parameter that relates to the optimized frequency, namely the optimized intermediate frequency and/or the optimized local oscillator frequency, calculated may be used internally in case that the device 10 corresponds to the measurement device 24. Alternatively or additionally the respective optimized frequency, namely the optimized intermediate frequency and/or the optimized local oscillator frequency, is displayed on the display 22 so that the user can retrieve the respective information for setting the separately formed measurement device 24 in an appropriate manner. In any case, it is ensured that the measurement of the multicarrier radio frequency signal RF can be done in an optimized manner.

For instance, the respective optimized frequency is used to set a local oscillator of the device 10 or rather a local oscillator of the separately formed measurement device 24 so that the measurement of the multicarrier radio frequency signal RF can be done in an optimized manner.

The input data may also comprise information with regard to the measurement device 24 or rather the device 10 that is used for measuring the multicarrier radio frequency signal RF. For instance, this information may relate to a model of the respective device 10, 24 so that any limitations of the overall measurement setup 8 are taken into account.

Accordingly, the multicarrier analyzing module 18 is configured to take parameters of the (measurement) device 10, 24 into account while calculating the optimized intermediate frequency and/or the optimized local oscillator frequency based on the input data. Put it another way, the input data comprises information of the measurement setup 8, for example information about the multicarrier radio frequency signal RF to be measured and the measurement device 24 or rather the device 10 used for measuring the multicarrier radio frequency signal RF.

The different data of the overall input data may be input via the input 16 of the user interface 20 and the input 16 for the radio frequency signal so that data related to the measurement setup 8 is input via the user interface 20, for example stored for further analyses, whereas data assigned to the multicarrier radio frequency signal RF is input via the input 16 for the radio frequency signal. However, all input data may be input via the input 16 of the user interface 20.

Generally, it is ensured that the respective measurement (s) of the multicarrier radio frequency signal RF can be done in an optimized manner since the occupied frequency configuration of the multicarrier radio frequency signal RF as well as any limitation or restrictions of the measurement setup 8 are taken into account when calculating the optimized intermediate frequency and/or the optimized local oscillator frequency.

The multicarrier analyzing module 18 selects a value for the respective optimized frequency from a range of values that ensures best measurement results. In other words, the multicarrier analyzing module 18 chooses a value for the respective frequency used as operation parameter that may lead to a maximized accuracy when measuring the multicarrier radio frequency signal RF with the measurement device 24 or rather the device 10 itself.

Accordingly, the respective optimized frequency used as an operation parameter of the respective (measurement) device 10, 24 corresponds to a variance during the analyzing process since the multicarrier analyzing module 18 is enabled to select the value from a certain range in an appropriate manner.

In some embodiments, the multicarrier analyzing module 18 may correspond to a software module so that the respective optimization process(es) performed by the multicarrier analyzing module 18 may be implemented by an (e.g., optimization) algorithm, which in some embodiments implements one or more methods described herein.

In some embodiments, the operation parameter of the measurement device 10, 24, namely the intermediate frequency and/or the local oscillator frequency, has been calculated previously for the respective multicarrier radio frequency signal RF. During the calculation, parameters assigned to the multicarrier radio frequency signal RF (and optionally parameters related to the measurement setup 8) have been taken into account so as to find the optimized value for the respective frequency. Accordingly it is ensured that an optimized measurement of the multicarrier radio frequency signal RF can be done since the optimized frequency with regard to the measurement environment, namely the measurement setup 8, has been calculated prior to the measurement of the multicarrier radio frequency signal RF.

Various components of the device 10 may include, in some embodiments, logic for implementing the technologies and methodologies described herein. This logic can be carried out in either hardware or software, or a combination of hardware and software. For example, in some embodiments, the multicarrier analyzing module 18 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the multicarrier analyzing module 18 includes a microprocessor and a memory storing logic modules and/or instructions. In an embodiment, the multicarrier analyzing module 18 includes one or more ASICs having a plurality of predefined logic components. In an embodiment, the multicarrier analyzing module 18 includes one or more FPGA having a plurality of programmable logic components. In an embodiment, the multicarrier analyzing module 18 includes hardware circuit implementations (e.g., implementations in analog circuitry, implementations in digital circuitry, and the like, and combinations thereof). In an embodiment, the multicarrier analyzing module 18 includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A device for analyzing a radio frequency signal, comprising:
    an analyzing module that is configured to analyze input data relating to a multicarrier radio frequency signal with at least two carrier frequencies, said multicarrier analyzing module being further configured to calculate at least one of an optimized intermediate frequency or an optimized local oscillator frequency based on said input data, said multicarrier analyzing module being configured to calculate at least one of said optimized intermediate frequency or said optimized local oscillator frequency automatically.

2. The device according to claim 1, wherein said multicarrier analyzing module is configured to analyze said input data automatically.

3. The device according to claim 1, further comprising an input via which said input data is input, said input being connected with said multicarrier analyzing module.

4. The device according to claim 1, wherein said input data corresponds to at least one of a multicarrier radio frequency signal or data that is input by a user of said device.

5. The device according to claim 1, wherein said multicarrier analyzing module is configured to measure parameters assigned to said at least two carrier frequencies.

6. The device according to claim 1, wherein parameters assigned to said at least two carrier frequencies are input by a user.

7. The device according to claim 1, wherein a display is provided that is connected to said multicarrier analyzing module of said device, said display receiving output data of said multicarrier analyzing module, said output data comprising at least one of said optimized intermediate frequency or said optimized local oscillator frequency.

8. The device according to claim 7, wherein said display is part of a user interface of said device.

9. The device according to claim 1, wherein said device is a measurement device that is configured to measure a radio frequency signal.

10. The device according to claim 9, wherein said measurement device is configured to use at least one of said optimized intermediate frequency or said optimized local oscillator frequency as an operation parameter for measuring said radio frequency signal.

11. The device according to claim 1, wherein said multicarrier analyzing module is configured to take parameters of said device into account while calculating at least one of said optimized intermediate frequency or said optimized local oscillator frequency based on said input data.

12. A method of analyzing a radio frequency signal, with the following steps:
    receiving input data that relates to a multicarrier radio frequency signal with at least two carrier frequencies;
    processing said input data;
    calculating at least one of an optimized intermediate frequency or an optimized local oscillator frequency based on said input data, and
    using at least one of said optimized intermediate frequency or said optimized local oscillator frequency as an operation parameter for measuring said radio frequency signal with at least two carrier frequencies.

13. The method of claim 12, wherein at least one of said optimized intermediate frequency or said optimized local oscillator frequency is calculated automatically.

14. The method of claim 12, wherein at least one of said optimized intermediate frequency or said optimized local oscillator frequency is at least one of output and displayed on a display.

15. The method of claim 12, wherein said input data is input by a user or said input data corresponds to a multicarrier radio frequency signal received.

16. The method of claim 12, wherein parameters assigned to said at least two carrier frequencies are at least one of measured or input by a user so as to obtain the information required.

17. The method of claim 12, wherein parameters of a measurement device are taken into account while calculating at least one of said optimized intermediate frequency or said optimized local oscillator frequency based on said input data, said measurement device measuring said radio frequency signal.

18. A non-transitory computer readable media having instructions stored thereon, that when executed by one or more computing devices, cause it to:
    receive input data that relates to a multicarrier radio frequency signal with at least two carrier frequencies;
    process said input data; and
    calculate at least one of an optimized intermediate frequency and an optimized local oscillator frequency based on said input data while taking parameters of a device for analyzing a radio frequency signal into account when calculating at least one of said optimized intermediate frequency or said optimized local oscillator frequency based on said input data.

* * * * *